United States Patent
Lindgren et al.

(10) Patent No.: US 11,136,914 B2
(45) Date of Patent: Oct. 5, 2021

(54) COMPRESSION IGNITED COMBUSTION ENGINE

(71) Applicant: Scania CV AB, Södertälje (SE)

(72) Inventors: Björn Lindgren, Älvsjö (SE); Manuel Schellhase, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/477,326

(22) PCT Filed: Jan. 9, 2018

(86) PCT No.: PCT/SE2018/050009
§ 371 (c)(1),
(2) Date: Jul. 11, 2019

(87) PCT Pub. No.: WO2018/143861
PCT Pub. Date: Aug. 9, 2018

(65) Prior Publication Data
US 2019/0368412 A1    Dec. 5, 2019

(30) Foreign Application Priority Data
Feb. 3, 2017   (SE) .................... 1750090-1

(51) Int. Cl.
*F02B 31/04*   (2006.01)
*F02F 1/42*    (2006.01)
*F02B 31/00*   (2006.01)

(52) U.S. Cl.
CPC ............ *F02B 31/04* (2013.01); *F02F 1/4214* (2013.01); *F02B 2031/006* (2013.01);
(Continued)

(58) Field of Classification Search
CPC .. F02B 31/04; F02B 2275/48; F02B 2031/00; F02B 2031/006; F02F 1/42; F02F 1/4214; F02F 1/4228; F02F 1/4235
(Continued)

(56) References Cited

U.S. PATENT DOCUMENTS 4,625,687 A * 12/1986 Hatamura ............. F02B 31/085
                                                    123/184.52
4,699,104 A    10/1987 Okumura
(Continued)

FOREIGN PATENT DOCUMENTS

CN    201810431 U    4/2011
CN    102822490 A    12/2012
(Continued)

OTHER PUBLICATIONS

Scania CV AB, International Application No. PCT/SE2018/050009, International Search Report, dated Mar. 9, 2018.
(Continued)

*Primary Examiner* — John Kwon
*Assistant Examiner* — Johnny H Hoang
(74) *Attorney, Agent, or Firm* — Moore & Van Allen PLLC; W. Kevin Ransom (57) ABSTRACT

A compression ignited combustion engine has at least one cylinder and first and second gas intake ports in a cylinder head restricting a combustion chamber. One gas intake passage leads to the two ports and is widened in a Y-shaped end influencing gas entering each port into a tangential flow in opposite direction with respect to the flow into the other port. The first intake port is designed to allow gas entering this port to continue said tangential flow so as to enter the combustion chamber in a swirl in a first rotation direction, whereas the second intake port is designed to guide gas
(Continued)

entering this port to also enter the combustion chamber in a swirl in said first rotation direction.

14 Claims, 5 Drawing Sheets

(52) U.S. Cl.
CPC ......... *F02B 2275/48* (2013.01); *F02F 1/4228* (2013.01); *F02F 1/4235* (2013.01)

(58) Field of Classification Search
USPC .................. 123/65 A, 65 P, 73 A, 306, 308
See application file for complete search history.

(56) References Cited

U.S. PATENT DOCUMENTS

| | | | | |
|---|---|---|---|---|
| 4,702,207 | A * | 10/1987 | Hatamura | ............ F02B 31/085 |
| | | | | 123/302 |
| 4,703,729 | A | 11/1987 | Sakano et al. | |
| 5,558,061 | A * | 9/1996 | Suminski | ................ F02B 31/00 |
| | | | | 123/188.14 |
| 6,006,719 | A | 12/1999 | Matsumura | |
| 6,213,090 | B1 | 4/2001 | Tamai et al. | |
| 7,077,102 | B1 * | 7/2006 | Stowe | ..................... F02B 31/00 |
| | | | | 123/306 |
| 7,878,172 | B2 * | 2/2011 | Fritz | ..................... F02B 31/082 |
| | | | | 123/306 |
| 2002/0162526 | A1 * | 11/2002 | Yager | ..................... F01L 1/267 |
| | | | | 123/188.8 |
| 2019/0186442 | A1 * | 6/2019 | Kim | ..................... F02M 35/108 |
| 2019/0186443 | A1 * | 6/2019 | Chu | ..................... F02M 35/108 |

FOREIGN PATENT DOCUMENTS

| | | |
|---|---|---|
| DE | 1214045 B | 4/1966 |
| EP | 0619424 B1 | 3/1997 |
| EP | 0790398 B1 | 5/2002 |
| EP | 2131025 A1 | 12/2009 |
| FR | 2894615 A1 | 6/2007 |
| GB | 2484747 A | 4/2012 |
| JP | S4951409 A | 5/1974 |
| JP | S58197420 A | 11/1983 |
| JP | S61104119 A | 5/1986 |
| KR | 19980087223 A | 12/1998 |

OTHER PUBLICATIONS

Scania CV AB, International Application No. PCT/SE2018/050009, Written Opinion, dated Mar. 9, 2018.
Scania CV AB, Swedish Application No. 1750090-1, Office Action, dated Oct. 13, 2017.
Scania CV AB, International Application No. PCT/SE2018/050009, International Preliminary Report on Patentability, dated Aug. 6, 2019.
Scania CV AB, Korean Application No. 10-2019-7024838, Office Action, dated Jun. 23, 2020.
Scania CV AB, European Application No. 18747223.8, Extended European Search Report, dated Nov. 5, 2020.
Scania CV AB, Chinese Application No. 201880008445.0, First Office Action, dated Sep. 27, 2020.
Scania CV AB, Chinese Application No. 201880008445.0, Second Office Action, dated May 17, 2021.

* cited by examiner

COMPRESSION IGNITED COMBUSTION ENGINE

CROSS-REFERENCE TO RELATED APPLICATIONS

This application is a national stage application (filed under 35 § U.S.C. 371) of PCT/SE2018/050009, filed Jan. 9, 2018 of the same title, which, in turn, claims priority to Swedish Application No. 1750090-1 filed Feb. 3, 2017; the contents of each of which are hereby incorporated by reference.

FIELD OF THE INVENTION

The present invention relates to a compression ignited combustion engine comprising: at least one cylinder and first and second gases intake ports in a cylinder head restricting a combustion chamber of the cylinder, said intake ports opening into the combustion chamber; and one gases intake passage leading towards the two ports perpendicularly to a line along which these ports are arranged in the cylinder head beside each other and to both ports by being widened in the direction of said line while forming a Y-shaped end influencing gases entering each said port into a tangential flow in opposite direction with respect to the flow into the other port.

BACKGROUND OF THE INVENTION

When developing gas intake passages with gas (normally air) intake ports to combusting engines there is always an attempt to create a movement of the gas in the combustion chamber of the cylinder being an optimum for the intended combustion combined with a flow resistance being as low as possible and a temperature increase of the gas being as low as possible. A low flow resistance results in a lower fuel consumption and a higher power may be obtained, whereas a low gas temperature contributes to a higher density of the gas, i.e. more mass of gas in the cylinder for a certain pressure, which also contributes to a lower heat transfer in the combustion chamber also increasing the efficiency of the combustion.

By having one gas intake passage in common to the two intake ports and providing this with the Y-shaped end the total surface for heat transfer interaction with the gas will be considerably smaller than would a separate gas intake passage lead to each intake port which results in a reduced heat transfer to the gas and also a lower flow resistance.

How the gas is moving in the combustion chamber is of importance for the efficiency of the combustion taking place therein and by that also the amount and nature of emissions created by the combustion. There are two main gas movement patterns in the combustion chamber of combustion engines, of which one is of more importance for compression ignited combustion engines, and that is according to a swirl. Swirl is here defined as a rotation of the gas around an axis through the center of the combustion cylinder, i.e. an axis extending in the direction of the movement of the piston. Once obtained through supplying gas into the combustion chamber according to this movement this gas movement is maintained in the combustion chamber during the intake and compression strokes. Such swirl has a positive influence upon the late oxidation phase in the cylinder during the power stroke, which increases the efficiency of the combustion and reduces emissions of soot. The other said gas movement pattern is tumble, which is defined as a rotation of the gas inside the combustion engine about an axis extending perpendicularly to the axis around which the swirl takes place. However, this gas movement is broken down during the compression stroke since the combustion chamber then changes height which leads to vortex stretching and vortex breakdown so that tumble is broken down to turbulence. This is very important for spark ignited combustion in Otto engines but not of significant importance in compression ignited combustion engines, such as in diesel engines, although tumble may there have a certain not neglectable influence upon the combustion.

Accordingly, there is of great importance to make gases introduced into a combustion chamber of a compression ignited combustion engine to create a swirl inside the combustion chamber.

U.S. Pat. No. 4,699,104 discloses an intake port structure for an internal combustion engine cylinder head having one gas intake passage in common to the two intake ports widened in an Y-shaped end, and this structure is designed to create a variable swirl. However, this structure involves a control valve for controlling flow resistance which will accordingly not be as low as possible and resulting in a fuel consumption which should be possible to lower. The same apply to the internal combustion engine known through U.S. Pat. No. 6,213,090 B1 which includes a ramp arranged for creating a swirl and which increases the flow resistance considerably. Besides that this publication concerns a spark ignited combustion engine.

SUMMARY OF THE INVENTION

The object of the present invention is to provide a compression ignited combustion engine of the type defined in the introduction being improved in at least some aspect with respect to such engines already known.

This object is according to the invention obtained by providing such an engine with the features listed in the characterizing part of appended patent claim 1.

By designing the first intake port to allow gas entering this port to continue the tangential flow so as to enter the combustion chamber in a swirl in a first rotation direction and designing the second intake port to guide gas entering this port to also enter the combustion chamber in a swirl in said first rotation direction a swirl will efficiently be created inside the combustion chamber at a low flow resistance.

According to an embodiment of the invention said second intake port contains a guiding arrangement configured to guide at least a portion, such as a minor part, of gases entering this port into a helical flow to leave this port and enter the combustion chamber in a swirl in said first rotation direction. This results in an efficient creation of a swirl increasing the efficiency of the combustion inside the combustion chamber. It has been found that only a minor part of the flow has to be guided into a helical flow for achieving a rotating total flow. This results in small losses. Would instead a major part of the flow be guided into the helical flow this would result in larger losses.

According to another embodiment of the invention the guiding arrangement is configured to divide the second intake port into two parts, of which a first part is configured to guide gas entering the second intake port and flowing into this part to continue said tangential flow and a second part provided with means configured to guide gases flowing into this part to assume a helical flow, and the guiding arrangement comprises a member making the flows in the two parts of the second intake port to meet in a region and there be joined into one helical flow rotating in said first rotation direction towards and into the combustion chamber. By in this way letting a part of the flow entering the second intake port maintain a tangential flow while influencing the flow in the second part to travel along a helix and providing said member making these flows to meet and joined a very efficient combination of these flows with a low flow resistance and a swirl in the desired direction may be obtained.

According to another embodiment of the invention said second part has a shape of a helix extending towards the combustion chamber so as to guide gases entering this part to rotate around the axis of the helix in said first rotation direction. This constitutes an efficient way of creating said helical flow in the second part of the second intake port.

According to another embodiment of the invention said second part contains a boss-like member and walls guiding said gases in a helical movement around the boss-like member.

According to another embodiment of the invention said member in the flow meeting region comprises an obstacle forcing gases of the tangential flow in said first part to join the helical flow in the second part into a helical flow. Such an obstacle, when carefully designed, may efficiently guide the gases of the tangential flow so as to appropriately join the helical flow to together therewith continue in a helical flow.

According to another embodiment of the invention said member in the flow meeting region is a wedge configured to guide the tangential flow in said region at the end of said first part to join the helical flow in the second part into a helical flow to form a swirl in said first rotation direction moving towards and into the combustion chamber. A wedge-shape of a said obstacle is a suitable design thereof for creating the combined helical flow at a low flow resistance.

According to another embodiment of the invention said first part of the second intake port is an upper part more distant to an opening of the second intake port into the combustion chamber than the second part, and said member in the flow meeting region is configured to guide the tangential flow in the first part down into the helical flow in the second part and together therewith create one helical flow downwards towards and into the combustion chamber. This mutual position of the two parts of the second intake port results in a possibility to combine the flows therein into one single helical flow downwards towards and into the combustion chamber with a swirl in the same direction as the tangential flow entering the combustion chamber from the first intake port.

According to another embodiment of the invention the cross-section of the second part decreases in the direction the gas flow therethrough towards the combustion chamber. Such a cross-section reduction influences the velocity of the gas flow through the second part having a positive influence upon a generation of a positive swirl together with the flow of gases in the first part of the second intake port.

According to another embodiment of the invention openings of the first and second intake ports into the combustion chamber are located along a straight line in parallel with a crank shaft of the engine. Thanks to only one gas intake passage in common to the two intake ports and the Y-shaped end thereof a so-called straight valve picture may be obtained resulting in considerably improved exhaust channel performance of such an engine leading to a higher power of a turbo charger when present and a lower heat transfer between exhaust gases and the cylinder head, which is positive for performance and life span/strength. The straight valve picture also enables double overhead camshafts which open new possibilities to regulate the gas exchange both during engine braking and normal operation.

The invention also relates to a motor vehicle and a use of an engine according to the appended claims directed to a motor vehicle and a use.

Further advantages and advantageous features of the invention will appear from the description following below.

BRIEF DESCRIPTION OF THE DRAWINGS

With reference to the appended drawings, below follows a specific description of an embodiment of the invention cited as an example.

In the drawings.

DETAILED DESCRIPTION OF THE INVENTION

The features of a compression ignited combustion engine 1 essential for the present invention will now be described while making reference to FIGS. 1-5. This engine is arranged in a motor vehicle 24 and has at least one cylinder 2 and first 3 and second 4 gas intake ports in a cylinder head 5 restricting a combustion chamber 6 of the cylinder. The first intake port 3 and the second intake port 4 open into the combustion chamber. One gas intake passage 7 leads towards the two ports perpendicularly to a line 8 along which these ports are arranged in the cylinder head 5 beside each other and to both ports by being widened in the direction of the line 8 while forming a Y-shaped end 9 influencing gas entering each port into a tangential flow as shown through the arrow A for the first intake port 3 in opposite direction with respect to the tangential flow into the second port 4. "Tangential" does here relate to the extension of the internal walls of the cylinder defining the combustion chamber.

The first intake port 3 is designed to allow gas entering this port to continue the tangential flow so as to enter the combustion chamber in a swirl 10 (see FIG. 2) in a first rotation direction.

The second intake port 4 is designed to guide gas entering this port to also enter the combustion chamber in a swirl in said first rotation direction, and how that may be obtained will now be disclosed. The first intake port has only one part 11 influencing gas entering this part into a tangential flow. The second intake port 4 is divided into two parts 12, 13 shown as separate parts in FIG. 3. These three parts 11-13 are combined into the intake port structure 14 shown in FIG. 3. A first part 12 of the second intake port being an upper part more distant to an opening of the second intake port into the combustion chamber than a second part 13 is configured to guide gas entering the second intake port 4 and flowing into this part 12 to continue the tangential flow, which accordingly will be in the opposite direction as shown through the arrow A for the flow through the first intake port. A second part 13 is provided with means configured to guide gases flowing into this part to assume a helical flow. This is obtained by the fact that the second part has a shape of a helix extending towards the combustion chamber, which is obtained by arranging a boss-like member 15 inside the second part 13 and walls guiding the gas in a helical movement around this boss-like member.

Furthermore, an obstacle in the form of a wedge 16 is arranged in a region 17 where the tangential flow in the first part 12 of the second intake port 4 and the helical flow in the second part 13 will meet. This wedge is configured to guide the tangential flow in the region 17 to join the helical flow in the second part 13 into a helical flow to form a swirl 18 in the first rotation direction moving towards and into the combustion chamber. Thus, the gas led to the second intake port is "redirected" as simplifiedly illustrated through the arrows B in FIG. 1 to generate a swirl with the same rotation direction as the swirl generated by the gas flowing through the first intake port 3.

Figure 1:
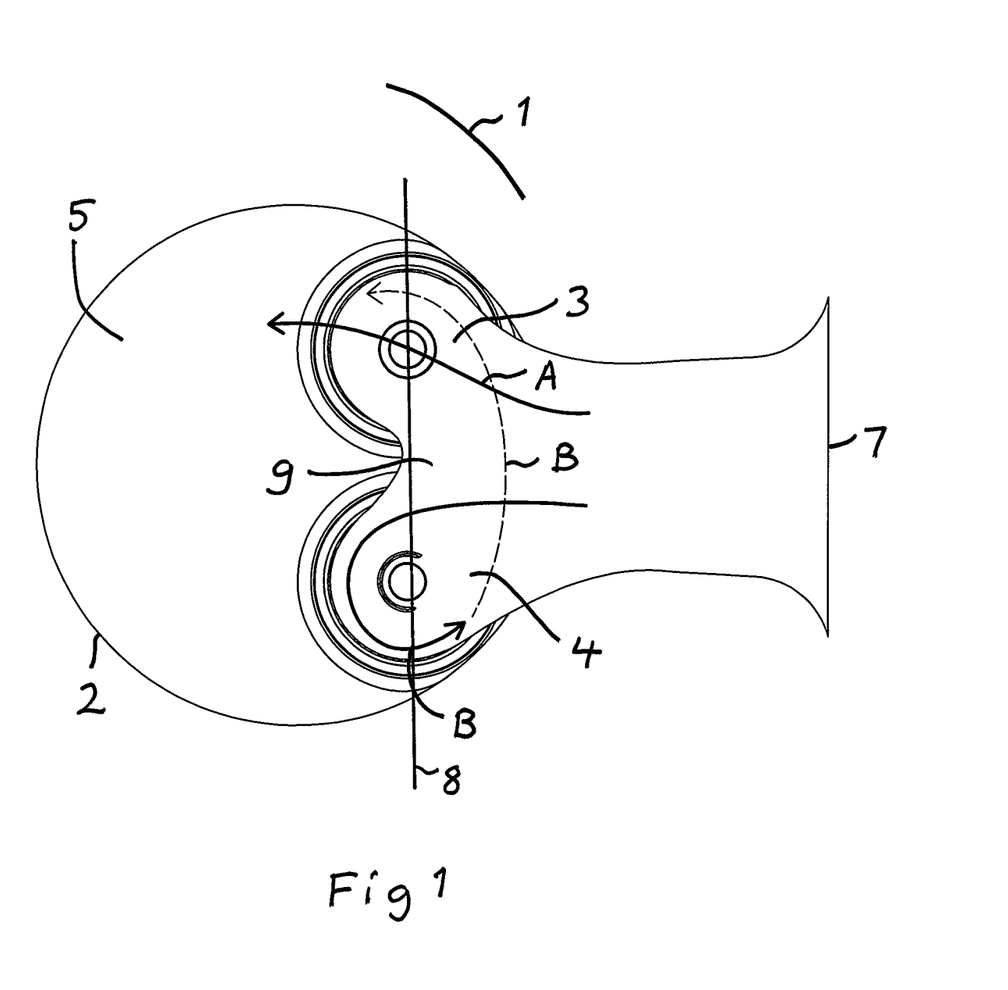
FIG. 1 illustrates very schematically the two intake ports and the cylinder of a compression ignited combustion engine according to the invention from above with intake air flows schematically indicated.
Figure 2:
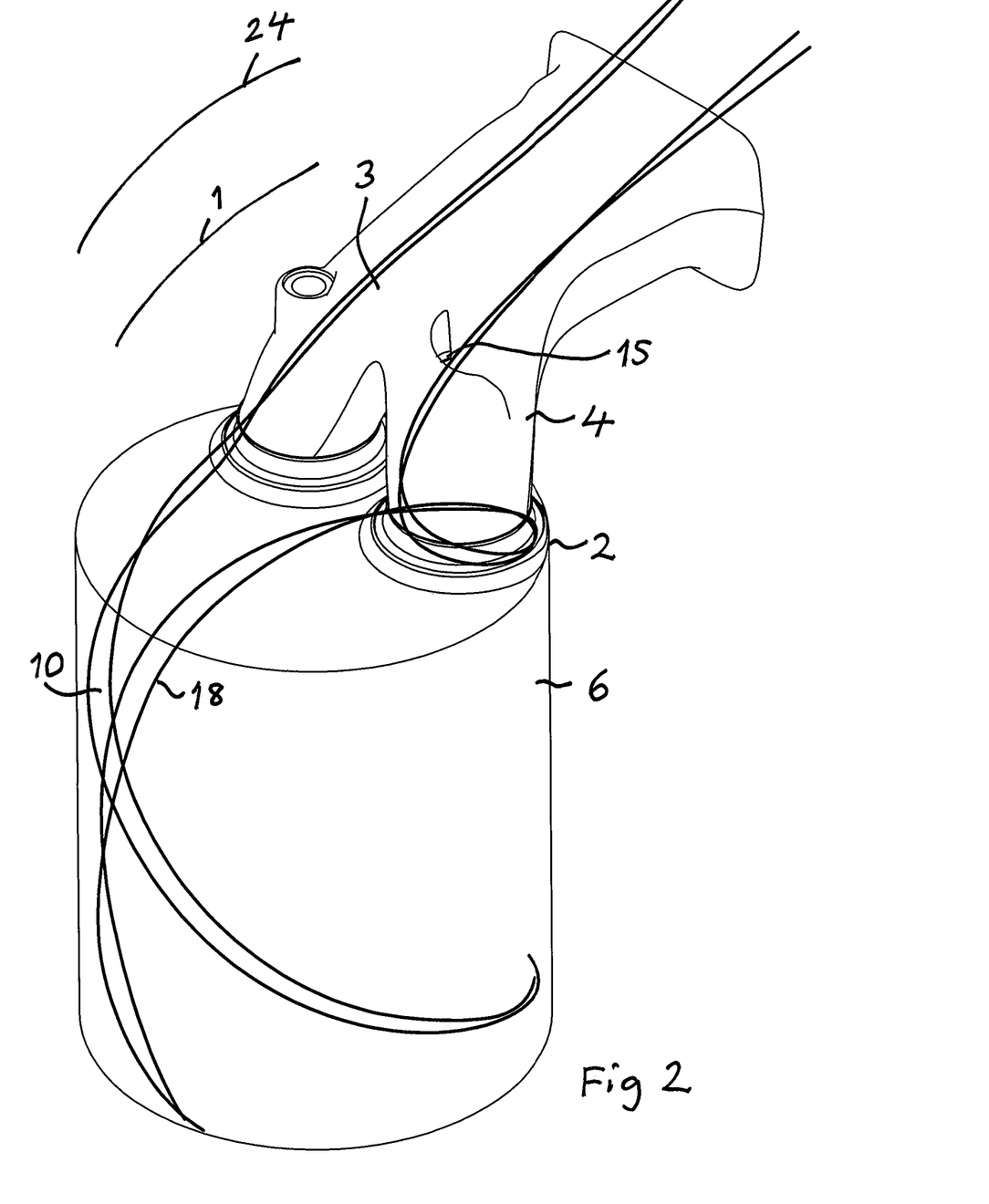
FIG. 2 is a schematic partially sectioned perspective view of the parts of the engine shown in FIG. 1.
Figure 3:
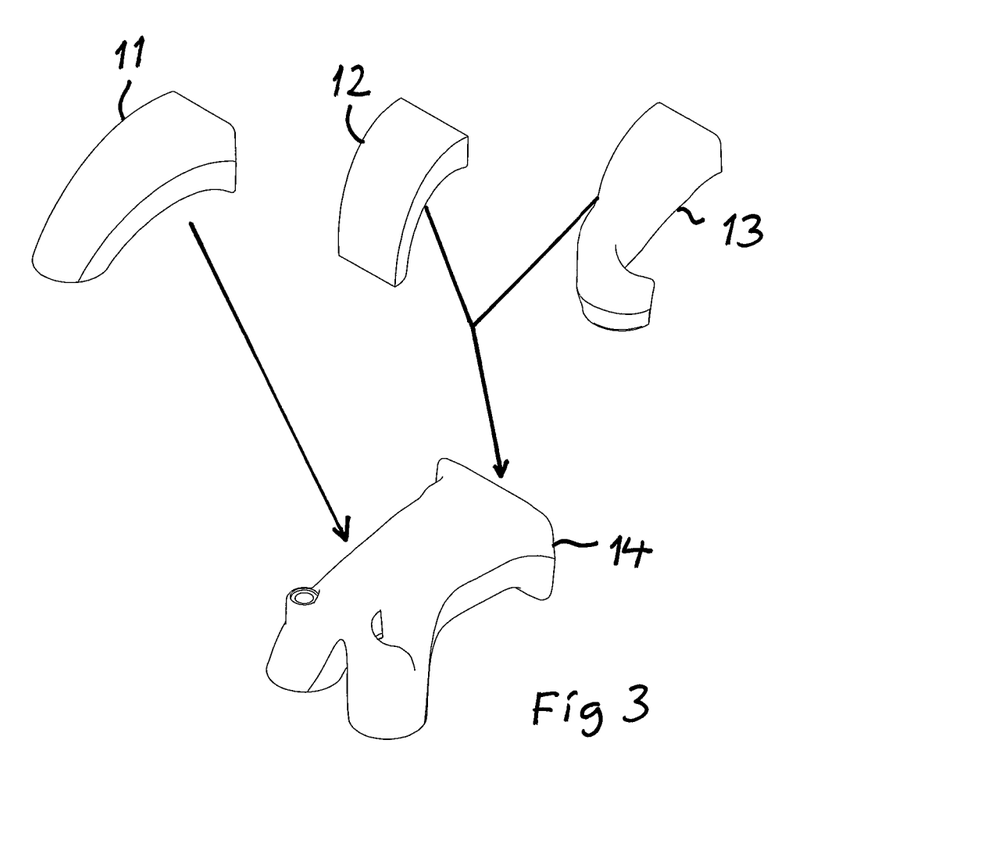
FIG. 3 is a schematic view used for explaining the different parts of the two intake ports of the engine according to the invention.
Figure 4:
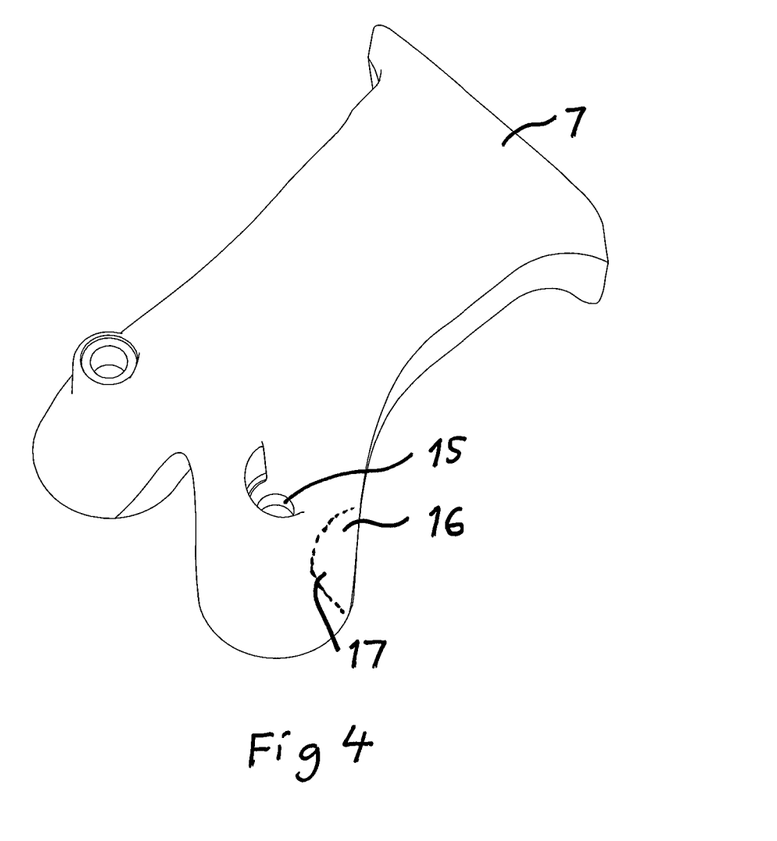
FIG. 4 is a perspective view of the intake ports in the engine according to the invention.
Figure 5:
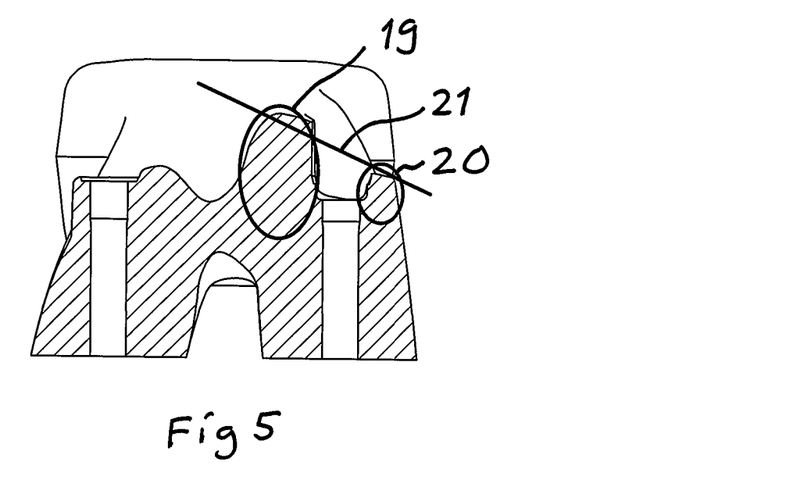
FIG. 5 shows a cross-section through the centre of the valves of the intake ports of the engine according to the invention.

The cross-section of the second part 13 of the second intake port and accordingly of said helix in this part decreases in the direction the gases flow therethrough towards the combustion engine as indicated through the regions 19 and 20 in FIG. 5, where the pitch of the helix is shown through the line 21.

Figure 6:
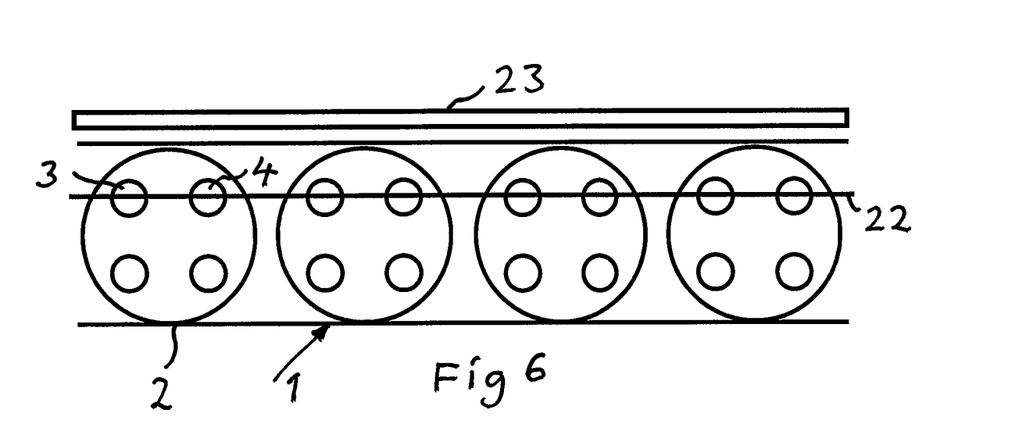
FIG. 6 is a very simplified view illustrating an engine according to the present invention.

FIG. 6 illustrates how the first intake port 3 and the second intake port 4 are located along a straight line 22 in parallel with a crank shaft 23 on the cold side of the engine 1, here shown to have four cylinders 2. The advantages of such a straight valve picture have been disclosed above.

The invention is of course in no way restricted to the embodiment described above, since many possibilities to modifications thereof are likely to be obvious to one skilled in the art without having to deviate from the scope of the invention defined in the appended claims.

The invention is not restricted to such an engine for any particular use and in industrial applications and in motor vehicles for propulsion thereof may be mentioned as examples of such a use. The most usual fuel to be combusted in such an engine is diesel, but other fuels are conceivable.

The invention claimed is:

1. A compression ignited combustion engine comprising:
    at least one cylinder comprising:
        a combustion chamber;
        a cylinder head; and
        first and second gas intake ports arranged in the cylinder head each extending parallel to a first axis into the cylinder head, each of said first and second intake ports comprising an opening into the combustion chamber; and
    a gas intake passage extending from the first and second gas intake ports, along a length-wise extension that is substantially perpendicular to the first axis, said gas intake passage comprising a central passage leading to a Y-shaped end, where the Y-shaped end comprises respective individual passages leading from the central passage, where one of said individual passages is connected to said first gas intake port and the other of said individual passages is connected to the second gas intake port,
    wherein the first gas intake port is configured to guide gases into the combustion chamber along a tangential flow path in a first rotation direction, and
    wherein the second gas intake port is configured to guide gases into the combustion chamber, wherein said second gas intake port comprises a guiding arrangement configured to divide the second intake port into first and second guide parts, wherein the first guide part is configured to guide gases along the tangential flow path to the combustion chamber and the second guide part is provided with means for creating a helical flow path of the gases in the first rotation direction in the second guide part prior to the gases entering the combustion chamber.

2. An engine according to claim 1, wherein the guiding arrangement further comprises a member configured to cause gases flowing from the first guide part and from the second guide part of the guiding arrangement to meet in a region and be joined to create the helical flow path in the joined the gases rotating in the first rotation direction prior to the gases entering into the combustion chamber.

3. An engine according to claim 2, wherein said second guide part of the guiding arrangement is shaped as a helix extending along an axis in a direction towards the combustion chamber so as to guide gases entering said second guide part to rotate around the axis of the helix shape in the first rotation direction.

4. An engine according to claim 3, wherein said second guide part of the guiding arrangement contains a boss-like member and walls guiding said gases in the helical flow path around the boss-like member.

5. An engine according to claim 2, wherein said member of said guiding arrangement comprises an obstacle forcing gases in the tangential flow path from said first guide part of the guiding arrangement to join gases in the helical flow path from the second guide part of the guiding arrangement.

6. An engine according to claim 5, wherein said member of the guiding arrangement is shaped as a wedge and is configured to guide gases in the tangential flow path exiting the first guide part of the guiding arrangement to join gases in the helical flow path exiting the second guide part of the guiding arrangement.

7. An engine according to claim 2, wherein the first guide part of the guiding arrangement is positioned in an upper part of the second intake port further from the opening of the second intake port into the combustion chamber than the second guide part of the guiding arrangement, and wherein that said member is configured to guide gases in the tangential flow path exiting the first guide part of the guiding arrangement into gases in the helical flow path exiting the second guide part of the guiding arrangement to thereby create one combined helical flow of gases into the combustion chamber.

8. An engine according to claim 2, wherein a cross-section of the second guide part of the guiding arrangement decreases in a direction the gases flow therethrough towards the combustion chamber.

9. An engine according to claim 1, wherein the respective openings of the first and second intake ports into the combustion chamber are both located along a straight line that is parallel with a lengthwise extension of a crank shaft of the engine.

10. An engine according to claim 1, wherein means for guiding gases in a helical flow path to the combustion chamber is a wedge located in the second guide part.

11. A motor vehicle comprising a compression ignited combustion engine comprising:
    at least one cylinder comprising: a combustion chamber;
    a cylinder head; and
    first and second gas intake ports arranged in the cylinder head each extending parallel to a first axis into the cylinder head, each of said first and second intake ports comprising an opening into the combustion chamber; and a gas intake passage extending from the first and second gas intake ports, along a length-wise extension that is substantially perpendicular to the first axis, said gas intake passage comprising a central passage leading to a Y-shaped end, where the Y-shaped end comprises respective individual passages leading from the central passage, where one of said individual passages is connected to said first gas intake port and the other of said individual passages is connected to the second gas intake port, wherein the first gas intake port is configured to guide gases into the combustion chamber along a tangential flow path in a first rotation direction, and wherein the second gas intake port is configured to guide gases into the combustion chamber, wherein said second gas intake port comprises a guiding arrangement configured to divide the second intake port into first and second guide parts, wherein the first guide part is configured to guide gases along the tangential flow path to the combustion chamber and the second guide part is provided with means for creating a helical flow path of the gases in the first rotation direction in the second guide part prior to the gases entering the combustion chamber.

12. A motor vehicle according to claim 11, wherein means for guiding gases in a helical flow path to the combustion chamber is a wedge located in the second guide part.

13. A method of creating propulsion of a vehicle comprising using an engine comprising:

at least one cylinder comprising: a combustion chamber; a cylinder head; and first and second gas intake ports arranged in the cylinder head each extending parallel to a first axis into the cylinder head, each of said first and second intake ports comprising an opening into the combustion chamber; and a gas intake passage extending from the first and second gas intake ports, along a length-wise extension that is substantially perpendicular to the first axis, said gas intake passage comprising a central passage leading to a Y-shaped end, where the Y-shaped end comprises respective individual passages leading from the central passage, where one of said individual passages is connected to said first gas intake port and the other of said individual passages is connected to the second gas intake port, wherein the first gas intake port is configured to guide gases into the combustion chamber along a tangential flow path in a first rotation direction, and wherein the second gas intake port is configured to guide gases into the combustion chamber, wherein said second gas intake port comprises a guiding arrangement configured to divide the second intake port into first and second guide parts, wherein the first guide part is configured to guide gases along the tangential flow path to the combustion chamber and the second guide part is provided with means for creating a helical flow path of the gases in the first rotation direction in the second guide part prior to the gases entering the combustion chamber.

14. A method according to claim 13, wherein means for guiding gases in a helical flow path to the combustion chamber is a wedge located in the second guide part.

* * * * *